United States Patent [19]

Izumi et al.

[11] Patent Number: 4,508,851

[45] Date of Patent: Apr. 2, 1985

[54] FIBROUS ACTIVATED CARBON AND PROCESS OF PRODUCING IT

[75] Inventors: Kazuo Izumi; Kenji Shimazaki; Kenji Seki, all of Shizuoka, Japan

[73] Assignee: Toho Beslon Co., Ltd., Tokyo, Japan

[21] Appl. No.: 506,269

[22] Filed: Jun. 21, 1983

[30] Foreign Application Priority Data

Jun. 23, 1982 [JP] Japan ................. 57-107760

[51] Int. Cl.$^3$ ............................................. C01B 31/12
[52] U.S. Cl. .................... 502/426; 502/416; 502/437; 210/690
[58] Field of Search ................ 502/416, 437, 426, 180

[56] References Cited

U.S. PATENT DOCUMENTS

| | | | |
|---|---|---|---|
| 3,617,506 | 11/1971 | Cole et al. ................ | 502/183 X |
| 3,702,832 | 11/1972 | Ermolenko et al. ........... | 502/426 X |
| 4,197,272 | 4/1980 | Tighe ............... | 502/180 X |
| 4,285,831 | 8/1981 | Yoshida et al. ............. | 502/426 X |

Primary Examiner—Patrick Garvin
Attorney, Agent, or Firm—Sughrue, Mion, Zinn, Macpeak and Seas

[57] ABSTRACT

Fibrous activated carbon having a pH not more than 5 which is suitable for recovering halogenated hydrocarbon solvents is disclosed. The fibrous activated carbon is obtained by acid treating raw fibrous activated carbon.

21 Claims, 1 Drawing Figure

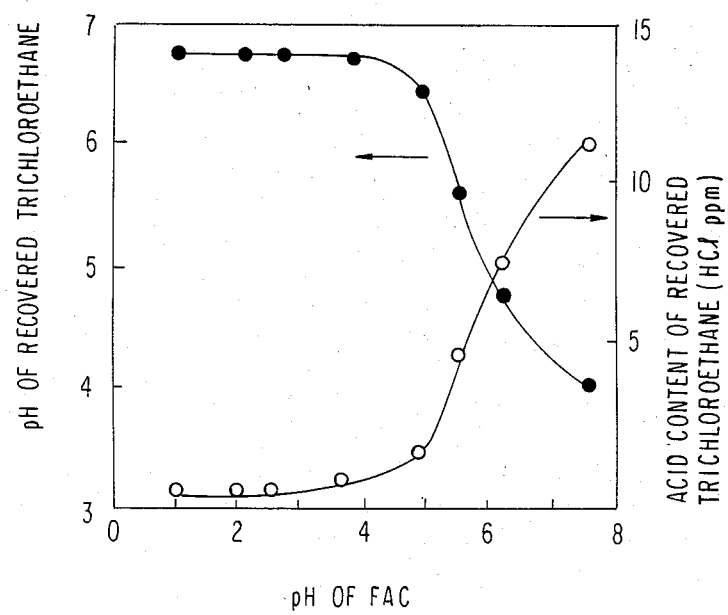

FIBROUS ACTIVATED CARBON AND PROCESS OF PRODUCING IT

FIELD OF THE INVENTION

This invention relates to fibrous activated carbon (hereinafter, is referred to as FAC) suitable for recovering halogenated hydrocarbon solvents and a process of producing such FAC. More particularly, the invention relates to a process of producing FAC having a lower pH.

BACKGROUND OF THE INVENTION

The pH of FAC in this specification is the value measured according to JIS K-1474, that is the pH value of water measured after adding 2 g of the dry sample (FAC) to 100 ml of pure water followed by mild boiling for 5 minutes and then cooling.

Hitherto, various processes have been proposed for recovering chlorinated hydrocarbon solvents such as tetrachloroethylene, trichloroethane, etc., which are largely used in the steps of dry cleaning, metal cleaning, printing, etc., using granular activated carbon. However, these conventional processes have many faults.

When the aforesaid chlorine-containing solvent is recovered using granular activated carbon, the solvent thus recovered is decomposed due to its easy decomposability. Acids formed by the decomposition of the solvent, and present in the solvent thus recovered, greatly reduce the quality of the recovered solvent. Furthermore, the acids formed by the decomposition of the solvent can cause eroding of the recovery apparatus.

In order to improve such conventional techniques, a process of using fibrous activated carbon as an adsorbent has been proposed.

It is known that fibrous activated carbon shows higher adsorption and desorption rates than conventional granular activated carbon and when using fibrous activated carbon, the decomposition of the recovered solvent is less due to the short desorption time thereof. However, even in the case of using such fibrous activated carbon or FAC, the quality of the recovered product or solvent does not always reach a satisfactory level and the quality deviation of the recovered product depends largely upon the recovery conditions.

SUMMARY OF THE INVENTION

An object of this invention is to provide FAC capable of recovering by adsorption an easily decomposable halogenated hydrocarbon solvent at high purity and also to provide a process of producing such FAC.

The inventors have discovered that by using fibrous activated carbon having a specific pH, halogenated hydrocarbons can be stably recovered in a far higher quality than that by a conventional recovering process and have succeeded in attaining the present invention.

That is, according to this invention, there is provided fibrous activated carbon having a pH not higher than 5.

Such FAC of this invention can be obtained by acid-treating raw fibrous activated carbon.

BRIEF DESCRIPTION OF THE DRAWING

The FIGURE is a graph showing the relation between the pH of fibrous activated carbon and the quality (pH and acid content) of recovered trichloroethane.

DETAILED DESCRIPTION OF THE INVENTION

The raw FAC preferably used for producing the FAC of this invention has such a specific surface area and a benzene adsorption rate constant that the specific surface area becomes at least 500 m$^2$/g and the benzene adsorption rate constant becomes at least 0.1 min$^{-1}$ after an acid treatment. Usually, the reduction of specific surface area of the raw FAC by an acid treatment is as slight as about 10 m$^2$/g to about 20 m$^2$/g, therefore, it is necessary that the lower limit of the specific surface area of FAC as raw material is slightly larger than 500 m$^2$/g by the amount reduced in the acid treatment. On the other hand, the change in the benzene adsorption rate constant of the raw FAC by acid treatment is ignorably small and, therefore, the lower limit of the benzene adsorption rate constant of raw FAC may be 0.1 mm$^{-1}$.

In general, fibrous activated carbon is produced by the following process. For example, FAC is usually produced by preoxidizing acrylonitrile-based fibers or carbonating pitch-based fibers or phenol-based fibers and then activating the preoxidized or carbonated fibers under an atmosphere of activating gas, such as steam, carbon dioxide, ammonia gas or a mixture thereof, usually at about 700°–1000° C.

In this invention, it is most preferred to use FAC obtained from acrylonitrile-based fibers.

By the term "acrylonitrile-based fiber" as used in this invention is meant a fiber made of an acrylonitrile polymer or a mixture thereof comprising preferably at least about 85% by weight, more preferably 90–98% by weight acrylonitrile.

In the present invention, mixtures of homopolymers and copolymers or mixtures of copolymers themselves can be used to produce the fibers. Moreover, copolymers containing less than about 85% by weight acrylonitrile can be used in admixture with an acrylonitrile polymer or polymers to produce the fibers. The amount of acrylonitrile in the ultimate fibers preferably exceeds about 85% by weight. Denatured acrylonitrile polymers may also be used.

Comonomers which can be introduced into the above copolymers include addition-polymerizable vinyl compounds such as vinyl chloride, vinylidene chloride, vinyl bromide, acrylic acid, methacrylic acid, itaconic acid; the salts (e.g., the sodium salts) of these acids; derivatives of these acids, e.g., acrylic acid esters (e.g., alkyl esters containing 1 to 4 carbon atoms in the alkyl moiety such as methyl acrylate, butyl acrylate, and the like), methacrylic acid esters (e.g., alkyl esters containing 1 to 4 carbon atoms in the alkyl moiety, such as methyl methacrylate, and the like); amides (e.g., acrylamide, N-methylolamide, and the like); acid chlorides; allyl sulfonic acid, methallyl sulfonic acid, vinyl sulfonic acid, vinyl benzenesulfonic acid, and the salts (e.g., such as sodium salt, calcium salt, zinc salt, etc.) of these acids; vinyl acetate; 2-hydroxymethyl ethylacrylate; 2-hydroxymethyl methylacrylate; 2-hydroxyethyl acrylate; 2-hydroxyethyl methacrylate; 2-hydroxymethylacrylonitrile; 2-hydroxyethylmethacrylate; 2-hydroxymethylacrylonitrile; 2-hydroxyethylacrylonitrile; 2-chloroethylacrylate; 2-hydroxy-3-chloropropylacrylate; vinylidene cyanide; vinyl pyridine; α-chloroacrylonitrile; and the like. In addition, those compounds described in U.S. Pat. No. 3,202,640 (incorporated herein by reference to disclose such compounds) can be also used.

There is no particular restriction relating to the fineness or size of acrylonitrile-based fibers used in this invention but fibers having a size of 0.9 d (denier) to 15 d, particularly 1.5 d to 5 d are preferred.

If the size of the fibers is finer than 0.9 d, the strength of the fibers is low and the fibers are liable to be cut. On the other hand, if the size of the fibers is larger than 15 d, the preoxidation speed for the fibers becomes low and also when the fibers are converted into FAC, the strength and elasticity of modulus of FAC formed become low and the activation efficiency of the FAC is reduced.

A process of producing FAC using such acrylonitrile-based fibers as the raw material is fundamentally known as described below.

That is, FAC is generally obtained by subjecting acrylonitrile-based fibers to an oxidation treatment and an activation treatment.

The oxidation treatment is performed by heat-treating the fibers in an oxidative atmosphere. The medium for the oxidative atmosphere may be air, oxygen, sulfurous acid gas, etc., which may be used solely or as a mixture or as a mixture of the foregoing gas and an inert gas or hydrochloric acid gas. However, a mixture of air and nitrogen is most preferred with respect to economy and stability in the treatment step.

The time required for the oxidation treatment is usually 0.5 to 30 hours, preferably 1.0 to 10 hours and it is preferred to perform the oxidation treatment until the oxygen-bonded amount becomes higher than 15%.

The oxidation treatment is performed at a temperature of 200° C. to 400° C. and the optimum temperature for the oxidation treatment depends upon the kind of an oxidation medium and the amount of comonomers but is in the range of 225° C. to 300° C.

It is preferred that the tension applied to the fibers at the oxidation treatment be such that the shrinkage at the oxidation temperature becomes 70–90% of the free shrinkage percentage at the temperature during the oxidation treatment. If the value is less than 70%, the tow of the fibers is liable to be cut and if the value is higher than 90%, the mechanical properties of the fibers are reduced during the activation step and the fibers become brittle, whereby fibers having good workability are not obtained. (In this case, the free shrinkage percentage means the shrinkage percentage when the fibers are subjected to an oxidation treatment under the application of a load of 1 mg/d to the filament.)

Prior to the oxidation treatment of acrylonitrile-based fibers, inorganic compounds such as Si compounds, Al compounds (Japanese Patent Application (OPI) Nos. 176220/82, and 191328/82 corresponding to U.S. Patent Application Ser. No. 371164, filed on Apr. 23, 1982 and now U.S. Pat. No. 4,412,937), or Fe compounds (U.S. Pat. No. 4,362,646) may be added to the fibers.

The oxidized fibers described above are then subjected to an activation treatment for from several seconds to 2 hours generally at a temperature of about 700° C. to 1,000° C.

The activating gas used in the activation treatment may be gasses such as steam, carbon dioxide or ammonia. These methods are disclosed in detail in, for example, U.S. Pat. Nos. 4,256,607 and 4,285,831.

Utilizing the above described method, FAC having a specific surface area of at least 500 m$^2$/g, a benzene adsorption amount of 15% to 50%, and a benzene adsorption rate constant of at least 0.1 min$^{-1}$ can be obtained. The specific surface area in the present invention is the value measured by a BET method and if the value is less than 500 m$^2$/g, the FAC cannot sufficiently recover halogenated hydrocarbons. FAC having the specific surface area of 2,000 m$^2$/g or more may be obtained but from the point of mechanical strength, it is preferred to use FAC having a specific surface area of about 1,300 m$^2$/g.

Another example of obtaining FAC is as follows: Phenolic fibers are obtained from a phenolformaldehyde novolak resin using the method disclosed in U.S. Pat. No. 3,650,102. From the thus obtained phenolic fibers FAC can be obtained using methods disclosed in Japanese Patent No. 862,751 and Japanese Patent Publications Nos. 41035/73 and 35432/75 to obtain FAC. In this method FAC having proper properties for use in the present invention can be obtained. FAC having a specific surface area of about 3,000 m$^2$/g can be obtained, however, from the point of mechanical strength it is preferred to use FAC which has a specific surface area of up to 2,500 m$^2$/g.

The benzene adsorption rate constant is shown by K in the following equation (the equation of Bohart and Adams):

$$\log(C_o/C - 1) = Con - (Kt/2.303)$$

wherein
  $C_o$: The concentration (constant) of benzene in a gas before treatment.
  C: The concentration of benzene in the gas treated by the FAC after t sec. from the starting of the adsorption treatment.
  K: Adsorption rate constant.
  Con: Constant.
  t: Time (sec.)

The benzene adsorption rate constant of FAC is obtained according to the aforesaid equation from the break curve when a nitrogen gas containing 100 ppm ($C_o$) of benzene is passed through an FAC layer packed at a packed density of 0.045 g/cm$^2$ in a thickness of 20 mm at a gas permeation rate of 10 cm/sec and normal temperature (25° C.).

In general, a larger benzene adsorption rate constant has such merits in that the adsorption range in the layer of FAC is short and the adsorption apparatus can be minimized.

Also, it is advantageous that the adsorption time is shortened corresponding to the adsorption rate.

Such a benzene adsorption rate constant depends upon the size of pores of FAC (a larger size exhibit a larger rate) the distribution of the pores, the form of the pores and the diameter of the constituting fibers (a smaller diameter exhibits a larger rate) but the benzene adsorption rate constant of the FAC produced as described above is higher than 0.1 min$^{-1}$. It is preferred to use FAC having a benzene adsorption rate constant of not less than 0.25 min$^{-1}$ in this invention. If the benzene adsorption rate constant is lower than 0.1 min$^{-1}$, the recovery yield and the quality of the recovered product are not sufficient by the reduction in adsorption and desorption rate.

Usually, the pH of FAC produced as above described depends to some extent upon the production condition or the kind and the content of the inorganic material contained therein but is generally in the range of 6 to 9.

Also, for example, the pH of FAC obtained from a phenol resin is usually 6 to 7.

The FAC of this invention can be obtained by adjusting the pH of FAC obtained by an optional method to not higher than 5 by treatment with an acid.

The acid treatment may be performed using a solution or a vapor of an inorganic acid such as sulfuric acid, hydrochloric acid, nitric acid, phosphoric acid, etc., or an organic acid such as formic acid, acetic acid, oxalic acid, etc. Usually, an inorganic acid such as sulfuric acid, etc., is preferably used.

The concentration of the acid solution in this case depends to some extent upon the kind of an acid used but is usually 0.1 to 30% by weight. The solvent is generally water, an organic solvent which is able to admix with water, such as an alcohol, acetone, etc., or a mixture thereof.

The acid treatment is usually performed for 1 to 120 minutes at 0° to 100° C. For performing the neutralization of an alkali in FAC and the uniform acid treatment, it is preferred to heat the FAC to 30° to 80° C. Then, after the acid treatment the FAC may be washed with pure water or city water to adjust the pH. In this case, it is preferred that the pH of the washing water is lower than 7, more preferably, 4 to 6. The temperature at washing is usually 0° to 100° C., preferably, 20° to 80° C.

By changing the concentration of the acid used for the acid treatment and, if necessary, performing water washing after the acid treatment as described above, the pH of FAC is adjusted to not higher than 5, preferably to 1 to 3. If the pH of the FAC is higher than 5, the effect for preventing the decomposition of halogenated hydrocarbons is insufficient. The pH may be lower than 1 but even if the pH is lower than 1, the effect of this invention is not further improved and thus due to possible erosion of the apparatus, the ph of the FAC is preferably not less than 1.

FAC may be acid-treated in the form of fibers, felt, textile, nonwoven fabric, etc. Also, after the acid treatment, FAC may be formed into a felt, textile, nonwoven fabric, etc. For preventing the acid treatment apparatus from being eroded by an acid, it is preferred to acid treat FAC which has been fabricated into felt, textile, nonwoven fabric, etc.

After the acid treatment, the FAC is dried at a temperature at which an acid attached or adsorbed to the fibers does not scatter away. The FAC is usually dried at a temperature lower than 100° C. It is preferred that the FAC is dried to such extent that the water content (the ratio of the amount of water in FAC to the total amount of completely dried FAC and water remaining in FAC after drying) becomes not more than 10%. Since FAC is usually treated with steam before use, the content of the FAC of this invention at use is increased to 10 to 25%.

By using the FAC of this invention having the pH adjusted to not higher than 5 as described above, the decomposition of easily decomposable halogenated hydrocarbons, in particular chlorine-containing organic solvent at a desorption step in the recovery of the solvent by adsorption can be prevented and high quality solvent can be recovered at a high efficiency.

The term halogenated hydrocarbons, in this invention, refers to easily decomposable halogenated hydrocarbon organic solvents such as methylene chloride, chloroform, carbon tetrachloride, 1,2-dichloroethane, 1,1-dichloroethane, 1,1,1-trichloroethane, 1,1,2-trichloroethane, 1,1,1,2-tetrachloroethane, 1,1,2,2-tetrachloroethane, 1,2-dichloroethylene, trichloroethylene, tetrachloroethylene, fluorotrichloromethane, 1,1,2-trichloro-1,2,2-trifluoroethane and 2-bromo-2-chloro-1,1,1-trifluoroethane.

Such as organic solvent is liable to decompose at the step of steam desorption and heat desorption and the decomposition is greatly accelerated by steam in the case of steam desorption to decrease the pH of the recovered solvent, increase the acid content, and increase the decomposition product, whereby the quality of the recovered product is reduced.

For recovering the easily decomposable solvent as above described, the fibrous activated carbon of this invention having the specific property is used.

For example, the result of determining the influence of the pH of the FAC derived from acrylonitrile-based fibers and having a specific surface area of 1,000 $m^2/g$, a benzene adsorption rate constant of 0.25 $min^{-1}$, and a pH of 3 on the quality of a chlorine-containing organic solvent recovered by adsorption using the FAC is as follows.

That is, after adjusting the pH of the aforesaid FAC to various pHs by the treatment of diluted sulfuric acid, 1,1,1-trichloroethane was recovered using each FAC and the quality (pH and acid content) of the solvent thus recovered was measured. The results are shown in the FIGURE.

As is clear from the results shown in the FIGURE, when the pH of FAC is in the range of 1 to 3, the acid content (calculated as HCl) does not increase and hence there is no reduction in pH of the recovered solvent. Also, the increase of the acid content when FAC having a pH of 3 to 5 is used is much less.

As described above, by using the FAC of this invention, easily decomposable halogenated hydrocarbons can be recovered without reducing the quality thereof.

The halogenated hydrocarbon ansorbed on the FAC of this invention is desorbed usually by contacting the FAC with steam of about 100° C. to 120° C. Also, the heat desorption of the hydrocarbon can be performed by passing a hot blast of air at about 80° C. to 150° C. through the FAC. The effect of this invention is particularly remarkable when using steam for desorbing the adsorbed halogenated hydrocarbon.

The invention will now be explained more practically by the following examples. However, the scope of the invention is not limited to the examples.

EXAMPLE 1

After crimping an oxidized fiber tow obtained by subjecting a copolymer fiber tow having single fiber size of 3 deniers with a total 560,000 deniers composed of 91% by weight acrylonitrile and 9% by weight methyl acrylate to an oxidation treatment at 225° C. for 2 hours and then 250° C. for 3 hours in the air, the tow was cut into a length of 102 mm by means of a cutter.

Then, the oxidized fiber stables thus obtained were supplied to a nonwoven fiber manufacturing apparatus to form a zonal oxidized fiber felt of 500 $g/m^2$.

The oxidized fiber felt was continuously activated in steam at 930° C. to provide a felt composed of FAC having a specific surface area of 1050 $m^2/g$ and the activated felt was subjected to acid treatment at 80° C. for 10 minutes by passing through a 0.3% by weight sulfuric acid bath, the fibers were washed with a shawer using pure water in an amount of 50 times the amount of the fibers for two minutes and then the content of water in FAC was reduced to 65% by means of a suqeeze roller, after this the fibers were dried at 100° C. using a hot blast to reduce the water content to 10%.

The FAC felt thus obtained had a specific surface area of 1,000 m²/g, a benzene adsorption rate constant of 0.3 min$^{-1}$, and a pH of 2.5.

The foregoing FAC felt was wound round a cylinder of 400 mm in outside diameter and 1,000 mm in length having many holes or perforation in the side wall with one closed end at a thickness of 120 mm and a density of 0.04 g/cm³ to provide an adsorption element. An adsorption apparatus having two adsorption cells each composed of the aforesaid adsorption element was prepared, each of said two adsorption cells being able of being used alternately for adsorption and desorption. Air containing 2300 ppm trichloroethylene was introduced into one adsorption cell of the foregoing adsorption apparatus at a rate of 10 Nm³/min.(N: the value calculated as a standard state) and when the air was passed through the adsorption cell for 6 minutes, the introduction of the air was changed to another adsorption cell of the apparatus and then steam having a temperature of 105° C. was introduced into the former cell at 20 kg/hr to perform desorption of trichloroethylene thus adsorbed.

In this case, since trichloroethylene was very easily desorbed from the FAC, the trichloroethylene was almost completely desorbed in a desorption time of 5 minutes.

The desorbing gas was introduced into a condenser to condense trichloroethylene, which was separated and recovered by means of a separator.

Thus, the adsorption and desorption were repeated 5 times for one adsorption cell as described above and the recovered liquids were collected.

The same procedure as above was also performed on FAC having a specific surface area of 1,000 m²/g, a benzene adsorption rate constant of 0.07 min$^{-1}$, and a pH of 2.5, raw FAC (pH 8) without the application of the acid treatment, and commercially available granular activated carbon.

Using FAC having a pH of 8, the adsorption and desorption procedures were performed under all the same conditions described above. However when the FAC having a benzene adsorption rate constant of 0.07 min$^{-1}$ was used, the adsorption and desorption procedures were performed under the same conditions described above except that the desorption time was 7 minutes. Furthermore, when using granular activated carbon (layer height of 600 mm), it took 120 minutes for the adsorption and 40 minutes (until the recovery percentage reached 90%) for the desorption, and the adsorption and the desorption were performed once for one adsorption cell, and the recovered liquid was collected.

The measurement results of the recovered liquids on these examples and comparison examples are shown in Table 1.

According to the results, it is understood that by using the FAC of the present invention trichloroethylene can be recovered at a high recovering efficiency without being accompanied by the decomposition of it. Thus, in the case of this invention, recovered products having very high quality can be obtained as compared to conventional fibrous activated carbon (FAC) and grnular activated carbon.

TABLE 1

| Adsorbent | | (A) | Recovered amount of solvent | Recovery rate | Quality of recovered product | |
|---|---|---|---|---|---|---|
| Kind | pH | (min$^{-1}$) | (kg/hr) | (%) | pH | Acid cont. (HCl ppm) |
| FAC* | 2.5 | 0.3 | 7.3 | 98 | 7.6 | 0.53 |
| FAC* | 2.5 | 0.07 | 7.0 | 94 | 6.1 | 2.2 |
| FAC** | 8.0 | 0.3 | 7.3 | 98 | 5.4 | 9.5 |
| GAC** | 7.5 | — | 6.7 | 90 | 3.7 | 128 |

*This invention
**Comparison example
(A): Benzene adsorption rate constant
FAC: Fibrous activated carbon
GAC: Granular activated carbon
fresh trichloroethylene: pH of 9.7, acid content of 0.31 ppm The quality of the recovered liquid was determined by the following method.

pH: To a test liquid was added pure water (pH=7) in an amount equal to that of the test liquid followed by vigorously stirring for 5 minutes. After allowing the mixture to stand the pH of the water layer thus formed was measured.

Acid content: To 50 ml of a test liquid was added 2 to 3 drops of an indicator (Bromotymol Blue) and the recovered product in the test liquid was titrated by 1/50N NaOH (an ethanol solution). The acid content was calculated from the titrated amount by the following equation.

Acid content (HCl ppm) =

$$\frac{\text{(titrated amount (ml))} \times f \times 0.730}{50 \times \text{(specific gravity of test liquid)}} \times 10^4$$

$f$: Factor of NaOH solution

EXAMPLE 2

Using the acid-treated FAC (pH=2.5), the comparison FAC (pH=8.0) without the application of the acid treatment, and the adsorption apparatus as used in Example 1, the adsorption and desorption of 1,1,1-trichloroethane were repeatedly performed and the reduction in quality of the recovered products by reuse was determined. The results are shown in Table 2.

From the results shown in the table, it is understood that by using the FAC of this invention, a recovered liquid having a high quality can be obtained. Further, since repeated use of the recovered product obtained using the FAC creates no problem with respect to the quality thereof, the recovered product can be reused as it is without need of applying any treatment such as the removal of acid components, etc. Also, the FAC of this invention can be repeatedly used without deteriorating the property.

TABLE 2

| | | | | Quality of recovered liquid | | | |
|---|---|---|---|---|---|---|---|
| Run No. | Trichloroethane | (a) | pH of FAC | pH | Acid content (HCl ppm) | Decomposition product (vinylidene chloride) (ppm) | water content (ppm) |
| 1 | fresh one | 0 | — | 7.0 | 0.5 | 48 | 100 |
| 2 | once-recovered product | 20 | 2.5 | 6.8 | 0.7 | 56 | 250 |
| | | | 8 | 4.5 | 11.3 | 235 | 248 |
| 3 | twice-recovered product | 20 | 2.5 | 6.7 | 0.3 | 51 | 265 |
| | | | 8 | 4.5 | 9.4 | 201 | 270 |
| 4 | thrice- | 15 | 2.5 | 6.7 | 0.8 | 65 | 255 |

TABLE 2-continued

| Run No. | Trichloroethane | (a) | pH of FAC | pH | Acid content (HCl ppm) | Decomposition product (vinylidene chloride) (ppm) | water content (ppm) |
|---|---|---|---|---|---|---|---|
| | recovered product | | 8 | 4.3 | 10.6 | 221 | 250 |
| 5 | 4 time-recovered procuct | 10 | 2.5 8 | 6.8 4.3 | 0.7 8.8 | 63 195 | 248 261 |

(a): Total number of adsorption and desorption times.
Adsorption: Air containing 2,000 ppm of trichloroethane was adsorbed at 10 m$^3$/min for 6 min.
Desorption: Trichloroethane was desorbed for 5 min. by steam of 105° C., the steam ratio (steam kg/trichloroethane kg) being 3.5.

In Table 2, the fresh one (liquid) is trichloroethane before applying the adsorption and desorption with FAC. The fresh liquid was vaporized in air to form a gas containing 2,000 ppm trichloroethane and the gas was subjected to the adsorption and desorption procedure using FAC. The once-recovered product is trichloroethane obtained by introducing the gas into the adsorption apparatus and alternately performing adsorption and desorption 20 times under the conditions as described above by the two adsorption cells. The twice-recovered product is trichloroethane obtained by vaporizing again the once-recovered product to form a gas containing 2,000 ppm trichloroethane and performing the adsorption and desorption procedure as in the case of Run No. 2 using the FAC used in Run No. 2 as it is. In Run No. 4 and Run No. 5, the same procedure as above was followed. However, in these cases the amount of trichloroethane was reduced, therefore, the number of the adsorption and desorption times was reduced.

When FAC having a pH of 2.5 was prepared using an inorganic acid such as hydrochloric acid, nitric acid, phosphoric acid, etc., in place of sulfuric acid and the recovery of 1,1,1-trichloroethane was performed using the FAC, almost the same results as when using the FAC treated with sulfuric acid were obtained.

EXAMPLE 3

A copolymer fiber tow (having a single fiber size of 2 deniers and composed of 280,000 single fibers) composed of 92% by weight acrylonitrile and 8% by weight vinyl acetate was subjected to an oxidation treatment at 230° C. for 2.5 hours and then at 255° C. for 2 hours in air to form oxidized fibers and after crimping the fibers by means of a crimper, the fibers were cut into a length of 102 mm.

Then, the oxidized fiber staple thus obtained were supplied to a nonwoven fiber manufacturing apparatus to form a zonal oxidized fiber felt of 600 g/m$^2$.

The oxidized fiber felt was activated in heated steam at 930° C. for 12 minutes to provide a felt composed of FAC having a specific surface area of 1270 m$^2$/g, passed through a 0.6% phosphoric acid bath to be acid-treated at 80° C. for 10 minutes, and after washing with water, was dried in the same manner as in Example 1.

The FAC felt thus obtained had a specific surface area of 1,250 m$^2$/g, a benzene adsorption rate constant of 0.35 min$^{-1}$, and a pH of 3.0.

The foregoing FAC felt was mounted on the adsorption apparatus as used in Example 1 (layer thickness of 100 mm, density of 0.04 g/cm$^3$). Air containing 1,500 ppm of methylene chloride was introduced into the adsorption cell at 10N m$^3$/min. and after passing therethrough the air for 8 minutes, the introduction of the air was stopped and super heated steam of a temperature of 105° C. was passed through the adsorption cell at 15 kg/hr. for 6 minutes to perform desorption. In this case the recovery rate was 90%. The pH of the recovered liquid was 8.8 and the acid content thereof was 0.9 ppm, and the acid content of the separated waste water was 1.8 ppm. Thus, the quality of the recovered product was almost same as that of the fresh liquid (pH=10.3, acid content: 10 ppm).

For comparison, the same recover test was performed on the FAC felt (pH=7.8) which was not treated with the acid treatment and the quality of the recovered product was measured. The results showed that the pH thereof was 4.9, the acid content was 3.5 ppm, and the acid content in the separated waste water was 92 ppm, which showed the results being inferior to those obtained by using the FAC of this invention.

EXAMPLE 4

FAC having a specific surface area of 1500 m$^2$/g, a benzene adsorption rate constant of 0.25 min$^{-1}$, and a pH 6.6 produced using phenol resin fibers (Kaynol, trade name, fibers obtained from phenol formaldehyde novolak resin, made by Gunei Kagaku Co.) was treated in a 1% by weight sulfuric acid solution at 30° C. for 10 minutes followed by washing with water to adjust the pH thereof to 3.0.

The FAC thus obtained was mounted on the adsorption apparatus as used in Example 1 (layer thickness of 100 mm, density of 0.04 g/cm$^3$). Air containing 1,500 ppm methylene chloride was introduced into the adsorption apparatus at 10N m$^3$/min and after passing the air therethrough for 3 minutes, the introduction of the air was stopped and then heated steam of a temperature of 105° C. was passed through the adsorption cell for 6 minutes at 15 kg/hr. to perform desorption. In this case, the recovery rate for the recovered liquid was high. The pH of the recovered liquid was 8.8, the acid content was 0.9 ppm, and the acid content of the separated waste water was 1.8 ppm. Thus, the quality of the recovered product or liquid was good and the reduction in quality of the recovered liquid was scarecely observed as compared with the fresh liquid (pH=10.3, acid content<1 ppm).

For comparison, the same test as above was performed with FAC having a pH of 6.6 which was not treated with the acid and the quality of the recovered liquid was determined. The pH of the recovered liquid was 5.6, the acid content thereof was 2.3 ppm, and the acid content of separated waste water was 78 ppm, which showed that the quality of the recovered liquid was inferior to that of the recovered liquid using the FAC of this invention.

EXAMPLE 5

The FAC as used in Example 3 was treated in a 0.3% by weight acetic acid solution at 30° C. for 10 minutes and dried at 80° C. for 120 minutes without washing with water to adjust the pH thereof to 2.8.

The FAC was mounted on the adsorption apparatus as used in Example 3 at a layer thickness of 100 mm and a density of 0.04 g/cm$^3$. Air containing 2,500 ppm of carbon tetrachloride was introduced into the adsorption apparatus at 10N m$^3$/min and after passing the air through the adsorption apparatus for 6 minutes, the introduction of the air was stopped and then a heated steam of a temperature of 105° C. was passed through the apparatus for 5 minutes at 15 kg/hr. to perform desorption.

In this case, the recovery rate of carbon tetrachloride was 95% and the pH of the recovered liquid was 6.0 and the acid content thereof was 10 ppm. That is, the quality of the recovered liquid was good and no reduction in quality of the recovered liquid was observed as compared to the fresh liquid (pH=6.0, acid content: 1 ppm).

For comparison, the same recovery test described above was performed on FAC having a pH of 6.6 which was not treated with the acid and the quality of the recovered liquid was determined. The results showed that the pH of the recovered liquid was 4.8 and the acid content thereof was 20.5 ppm. That is, the quality of the recovered product was low.

When FAC having a pH of 2.8 was prepared using an organic acid such as formic acid, oxalic acid, etc., in place of acetic acid and the recovery of carbon tetrachloride was performed by the same manner as above using the FAC, almost the same results as the case of using the FAC treated with acetic acid were obtained.

While the invention has been described in detail and with reference to specific embodiments thereof, it will be apparent to one skilled in the art that various changes and modifications can be made therein without departing from the spirit and scope thereof.

What is claimed is:

1. A process of producing fibrous activated carbon having a pH not greater than 5 by acid-treatment comprising (i) subjecting raw fibrous activated carbon fiber to an acid so as to attach or adsorb said acid to said fiber and (ii) if necessary, adjusting the pH of the fibrous activated carbon to not greater than 5, wherein the raw fibrous activated carbon has a specific surface area of at least 500 m²/g after the acid-treatment.

2. The process as claimed in claim 1 wherein the raw fibrous activated carbon has a benzene adsorption rate constant of at least 0.1 min$^{-1}$.

3. The process as claimed in claim 1 wherein the acid treatment is performed using a solution of an acid.

4. The process as claimed in claim 3 wherein the acid is an inorganic acid.

5. The process as claimed in claim 4 wherein the inorganic acid is an acid selected from the group consisting of sulfuric acid, hydrochloric acid, nitric acid and phosphoric acid.

6. The process as claimed in claim 3 wherein the acid is an organic acid.

7. The process as claimed in claim 6 wherein the organic acid is an acid selected from the group consisting of formic acid, acetic acid, and oxalic acid.

8. The process as claimed in claim 3 wherein the solution of acid contains 0.1 to 30% by weight acid.

9. The process as claimed in claim 3 wherein the acid treatment is performed at 0° to 100° C.

10. The process as claimed in claim 1 wherein the fibrous activated carbon is derived from fibers selected from the group consisting of acrylonitrile-based fibers, pitch-based fibers, and phenol-based fibers.

11. The process as claimed in claim 1 wherein the acid treatment is performed so that the pH of the fibrous activated carbon becomes 1 to 3.

12. The process as claimed in claim 1 wherein the fibrous activated carbon is washed with water after the acid treatment to adjust the pH thereof to not greater than 5.

13. The process as claimed in claim 1, wherein said acid-treatment is conducted by passing the raw fibrous activated carbon fiber through an acid bath.

14. The process as claimed in claim 1, wherein said acid-treatment is conducted using an acid vapor.

15. Fibrous activated carbon having a pH not greater than 5, wherein the raw fibrous activated carbon has a specific surface area of at least 500 m²/g.

16. The fibrous activated carbon as claimed in claim 15 wherein the benzene adsorption rate constant of the fibrous activated carbon is at least 0.1 min$^{-1}$.

17. The fibrous activated carbon as claimed in claim 15 wherein the fibrous activated carbon contains an inorganic acid.

18. The fibrous activated carbon as claimed in claim 17 wherein the inorganic acid is an acid selected from the group consisting of sulfuric acid, hydrochloric acid, nitric acid, and phosphoric acid.

19. The fibrous activated carbon as claimed in claim 15 wherein the fibrous activated carbon contains an organic acid.

20. The fibrous activated carbon as claimed in claim 19 wherein the organic acid is an acid selected from the group consisting of formic acid, acetic acid, and oxalic acid.

21. The fibrous activated carbon as claimed in claim 15 wherein the pH of the fibrous activated carbon is 1 to 3.

* * * * *